United States Patent
Gentsch

(10) Patent No.: US 9,912,141 B2
(45) Date of Patent: Mar. 6, 2018

(54) FAULT CURRENT LIMITER ARRANGEMENT

(71) Applicant: ABB Technology AG, Zurich (CH)

(72) Inventor: Dietmar Gentsch, Ratingen (DE)

(73) Assignee: ABB Schweiz AG, Baden (CH)

( * ) Notice: Subject to any disclaimer, the term of this patent is extended or adjusted under 35 U.S.C. 154(b) by 373 days.

(21) Appl. No.: 14/693,412

(22) Filed: Apr. 22, 2015

(65) Prior Publication Data
US 2015/0236497 A1    Aug. 20, 2015

Related U.S. Application Data

(63) Continuation of application No. PCT/EP2013/003156, filed on Oct. 21, 2013.

(30) Foreign Application Priority Data

Oct. 22, 2012    (EP) .................................... 12007263

(51) Int. Cl.
    *H02H 9/02*    (2006.01)
    *H02H 3/02*    (2006.01)
    (Continued)

(52) U.S. Cl.
    CPC ............ *H02H 3/025* (2013.01); *H01H 71/02* (2013.01); *H01H 71/10* (2013.01); *H01H 81/00* (2013.01);
    (Continued)

(58) Field of Classification Search
    CPC .......... H02H 9/02; H02H 9/025; H02H 9/001; H02H 9/021
    (Continued)

(56) References Cited

U.S. PATENT DOCUMENTS

| 2010/0266095 A1 | 10/2010 | Russell, II et al. |
| 2012/0175347 A1* | 7/2012 | Glaser ................. H01H 33/166 218/140 |
| 2012/0199558 A1* | 8/2012 | Faulkner ............... H01H 33/16 218/143 |

FOREIGN PATENT DOCUMENTS

| CH | 242 102 A | 4/1946 |
| DE | 1 244 916 B | 7/1967 |
| EP | 2 242 063 A2 | 10/2010 |

OTHER PUBLICATIONS

International Search Report (PCT/ISA/210) dated Nov. 20, 2013, by the European Patent Office as the International Searching Authority for International Application No. PCT/EP2013/003156.
(Continued)

*Primary Examiner* — Dharti Patel
(74) *Attorney, Agent, or Firm* — Taft Stettinius & Hollister LLP

(57) ABSTRACT

A fault current limiter arrangement for a low, medium and high voltage electricity grid, including a fault current limiter unit which is arranged in line with a circuit breaker unit including a fixed electrical contact which is connected to a lower electrical terminal and a movable electrical contact which is connected to an upper electrical terminal, in order to interrupt the current flow after the fault current limiter unit has limited the current flow in a detected fault event. The fault current limiter unit includes a movable electrical sliding contact part which is electrically arranged between the upper electrical terminal of the circuit breaker unit and the movable electrical contact of the circuit breaker unit, and which is movable between a short circuit position adjacent to the upper electrical terminal and a remote position far from the upper electrical terminal for providing a maximum electrical resistance for the current flow.

12 Claims, 2 Drawing Sheets

(51) Int. Cl.
  *H02H 3/08*   (2006.01)
  *H01H 71/10*  (2006.01)
  *H01H 71/02*  (2006.01)
  *H01H 81/00*  (2006.01)

(52) U.S. Cl.
  CPC ......... *H02H 3/08* (2013.01); *H01H 2221/014* (2013.01); *H01H 2221/046* (2013.01); *H01H 2223/008* (2013.01); *H01H 2235/02* (2013.01)

(58) Field of Classification Search
  USPC .............................................. 361/93.9, 93.1
  See application file for complete search history.

(56) References Cited

OTHER PUBLICATIONS

Written Opinion (PCT/ISA/237) dated Nov. 20, 2013, by the European Patent Office as the International Searching Authority for International Application No. PCT/EP2013/003156.

Extended European Search Report dated Mar. 21, 2013, by the European Patent Office in corresponding European Patent Application No. 12007263.2-1808.

* cited by examiner

FAULT CURRENT LIMITER ARRANGEMENT

RELATED APPLICATION(S)

This application claims priority as a continuation application under 35 U.S.C. § 120 to PCT/EP2013/003156, which was filed as an International Application on Oct. 21, 2013 designating the U.S., and which claims priority to European Application 12007263.2 filed in Europe on Oct. 22, 2012. The entire contents of these applications are hereby incorporated by reference in their entireties.

FIELD

The disclosure relates to a fault current limiter arrangement for a low, medium, and high voltage electricity grid, including a fault current limiter unit, which is arranged in line with a vacuum interrupter (circuit breaker unit), including a fixed electrical contact, which is connected to a lower electrical terminal and a movable electrical contact which is connected to an upper electrical terminal, in order to interrupt the current flow after the fault current limiter unit has limited the current flow in a fault event, detected by a fault current detector.

BACKGROUND INFORMATION

A fault current limiter is a device which can automatically limit fault currents in electrical distribution or transmission grids, in particular low, medium, and high voltage grids, to a low current value close to the nominal current. A benefit of such a device can be that it can reduce drastically the short circuit power of the electricity grid. This can allow interconnect grids without increasing the short circuit power and a decrease in safety margins so that other machineries connected to the network can be designed for lower short circuit power and, therefore, can be made lighter and with a lower effort.

According to known fault current limiters, high-temperature superconductors can be well suited for use in a fault current limiter due to their property to lose superconductivity and transit from the non-resistive superconducting state to a normal state with high electric resistivity when at least one of the critical current, the critical temperature or the critical magnetic field of the superconductor material is exceeded.

In normal operation with nominal current, for example, in the cooled state, the superconductor material is in its superconducting state with essentially zero resistance so that there is essentially no voltage over the whole fault current limiter. In consequence, the fault current limiter is "invisible" for the electricity grid. In case of short circuit fault current, the current can rise to several times the nominal current exceeding the critical current of the superconductor material which causes the superconducting material to transit to the normal resistive state with generation of high voltage. For example, in normal operation in the superconducting state essentially no voltage difference is observed at both ends of the fault current limiter, whereas in fault condition a large voltage difference is measured due to increasing electrical resistance. In order to avoid overheating and damage of the fault current limiter current flow through the fault current limiter should be interrupted within a limited period of time. Thus, a circuit breaker is usually arranged in line with the fault current limiter for switching off the current flow in case of a fault signal detected by fault current detection means.

The document EP 2 242 063 A discloses such a fault current detector for a fault current limiter arrangement. A high-temperature superconductor fault current limiter makes use of a differential protection relay wherein in a fault event the differential protection relay operates a triggering mechanism of a circuit breaker, whereby opening the electrical circuit and interrupting power supply to downstream components. The current limiter arrangement includes a current incoming end and a current outgoing end. The incoming end of the fault current limiter is electrically connected to a first measuring circuit and the outgoing end of the fault current limiter to a second current measuring circuit. In the fault event, voltage drop occurs across the current limiter with the voltage at the outgoing end of the current limiter being less than the voltage at the incoming end. Consequently, a current difference can be observed by the differential protection relay. If the observed value of the current difference exceeds the predetermined value, the differential protection relay sends a triggering signal to the circuit breaker and current flow is interrupted.

For operating the fault current limiter liquid nitrogen can be used in order to maintain the super-conductance property. To provide the cooling, permanent losses of energy can occur over the years.

SUMMARY

A fault current limiter arrangement is disclosed for a low, medium and high voltage electricity grid, comprising: a fault current limiter unit arranged in line with a circuit breaker unit for interrupting a current flow after the fault current limiter unit has limited current flow in a detected fault event, the circuit breaker unit including a fixed electrical contact connected to a lower electrical terminal and a movable electrical contact connected to an upper electrical terminal, wherein the fault current limiter unit includes a movable electrical sliding contact part electrically arranged between the upper electrical terminal of the circuit breaker unit and the movable electrical contact of the circuit breaker unit, and which is movable between a short circuit position adjacent to the upper electrical terminal and a remote position from the upper electrical terminal for providing a maximum electrical resistance for the current flow.

BRIEF DESCRIPTION OF THE DRAWINGS

The foregoing and other aspects of the disclosure will become apparent following the detailed description of the disclosure when considered in conjunction with the enclosed drawings.

DETAILED DESCRIPTION

Figure 1:
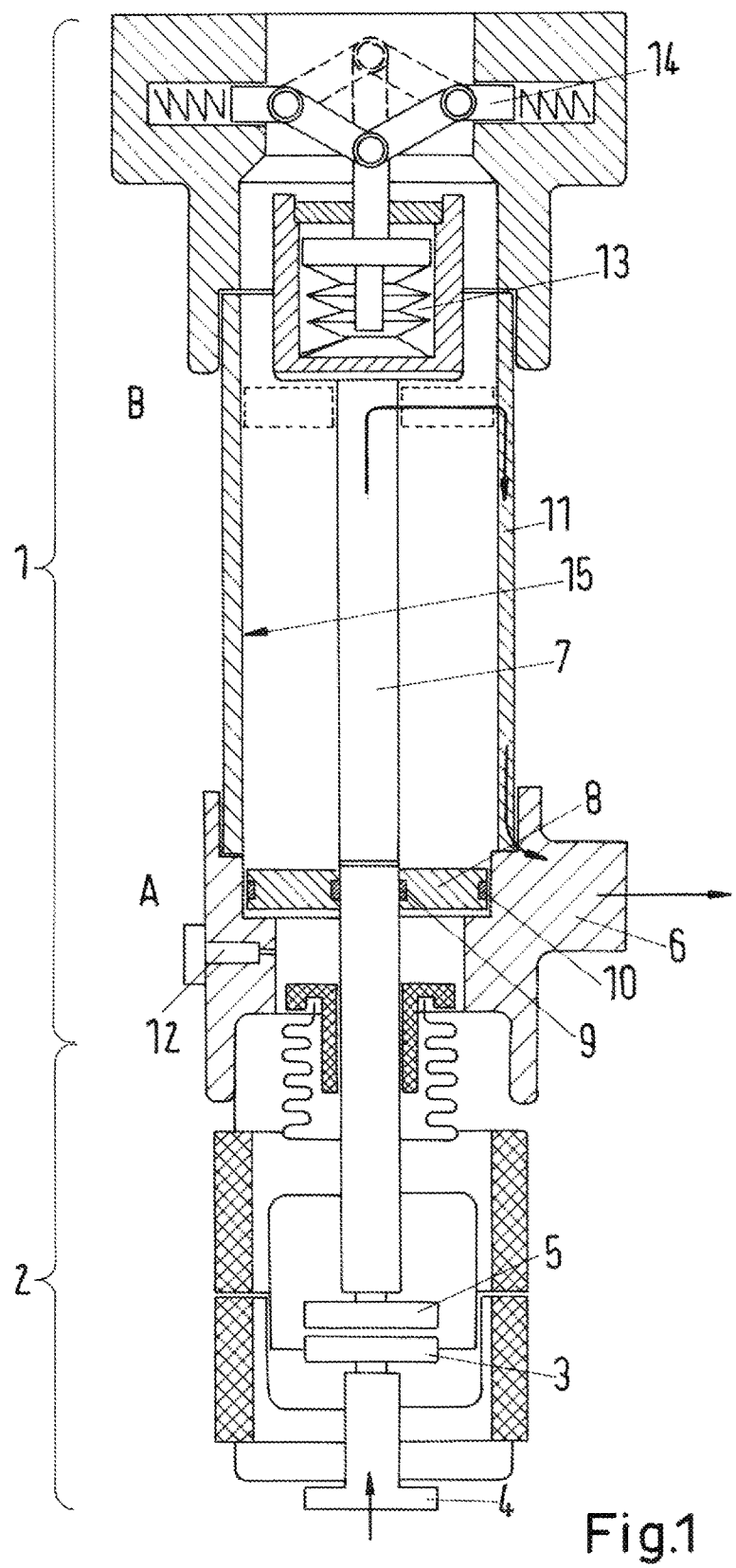
FIG. 1 shows a side view of a fault current limiter arrangement, according to an exemplary embodiment of the disclosure, including a fault current limiter unit arranged in line with a vacuum interrupter (circuit breaker unit).

Exemplary embodiments of the present disclosure provide a fault current limiter arrangement for a low, medium, and high voltage electricity grid including fast acting components in order to avoid overheating and which can be operated without cooling liquid.

According to an exemplary embodiment of the disclosure, a fault current limiter unit includes a movable electrical sliding contact part which is electrically arranged between the upper electrical terminal of the vacuum circuit breaker unit and the movable electrical contact of the vacuum circuit breaker unit, and which is movable between a short circuit position A adjacent to the upper electrical terminal and a remote position B far from the upper electrical terminal for providing a maximum electrical resistance for the current flow.

Because no cooling liquid is necessary according to exemplary embodiments of the disclosure, no permanent energy losses from the device themselves occurs. Only the resistive losses at the connecting terminals, which can be mainly made of copper or aluminum material, exist but these can be neglectable for all fault current limiters.

According to an exemplary embodiment of the disclosure, the movable electrical sliding contact part can generate the maximum electrical resistance in connection with a metallic pushrod for acting on the movable electrical contact of the vacuum interrupter (circuit breaker unit) and the metallic housing sleeve surrounding the pushrod and electrically connected to the upper electrical terminal. This special arrangement provides a compact design of the fault current limiter device.

Furthermore, the movable electrical sliding contact part can be shaped as a circular disk having an inner electrical sliding contact ring for connecting to the outer surface of the pushrod and an outer electrical sliding contact ring for connecting to the inner surface of the housing sleeve, designed as a resistor part. This can allow flowing current from the vacuum interrupter and the movable contact part to the upper electrical terminal in close position of the vacuum interrupter connection part (circuit breaker unit).

Additionally, a mechanical actuator is provided for axially moving the circular disk shaped sliding contact part along the pushrod in order to switch between the short circuit position A (here with less resistance at this position) and the remote position B (at the resistor area or at the end of the resistor). According to another exemplary embodiment, the mechanical actuator can include a compressed gas for acting on the circular disk shaped sliding contact part like a piston, wherein the compressed gas is stored in or generated from a micro gas generator which can be arranged in the area between the housing sleeve and the vacuum interrupter and the movable disc. During the movement of the disk shaped sliding contact part along the pushrod from the service position (with less resistance like an arrangement of a pole part) the short circuit position A and the remote position B, the electrical resistance will be increased by the fact that the inner material of the pushrod and the housing sleeve can be made of steel as a resistance material. At the moment when the movable sliding contact part reaches the remote position B, the resistance can have the maximum value to limit the fault current in the electricity grid and the vacuum interrupter (circuit breaker unit) will be switched in the opened position. This occurs due to mechanical impulse provided by the movable sliding contact part when it reaches the remote position B. At this moment the electrical current flows through the inner pushrod and the housing sleeve to the upper electrical terminal.

According to an exemplary embodiment of the disclosure, a contact force for keeping the electrical contacts of the vacuum interrupter (circuit breaker unit) closed is generated by a contact spring unit arranged at the distal end of the housing sleeve and mechanically connected to the pushrod. The contact spring unit is mechanically bistable. According to an exemplary embodiment described herein, the contact spring unit corresponds to a bistable mechanical mechanism unit in order to keep the electrical contacts in the closed position, which is actuated from a mechanical impulse provided by the disk shaped sliding contact part in its remote position B in order to bring the electrical contacts in the opened position.

According to another exemplary embodiment of the disclosure, the inner surface of the metallic housing sleeve can be provided with longitudinal cutting slots in order to increase the electrical resistance of the fault current limiter arrangement. Preferably, at least the outer surface of the metallic housing sleeve can be covered with a plastic insulation material. The plastic insulation material increases the mechanical stability of the fault current limiter—resistor—part of the device.

According to an exemplary of the disclosure, an additional driver can be provided for resetting the sliding contact part from the remote position B back to the short circuit position A. The additional driver can include an electromagnetic drive or the like. In case vacuum interrupters are installed on both sides, the arrangement can be reset by the operation in the opposite way. Here an additional disconnector is needed to make the opposite operation possible, according to the FIG. 2.

FIG. 1 shows a side view of a fault current limiter arrangement, according to an exemplary embodiment of the disclosure, including a fault current limiter unit arranged in line with a vacuum interrupter (circuit breaker unit). As shown in FIG. 1, the fault current limiter arrangement generally includes a fault current limiter unit 1 and a vacuum interrupter (circuit breaker unit) 2. The fault current limiter unit 1 and the vacuum interrupter (circuit breaker unit) 2 are arranged in line one to another.

The vacuum interrupter (circuit breaker unit) 2 includes a fixed electrical contact 3 which is connected to a lower electrical terminal 4. The fixed electrical contact 3 corresponds to a movable electrical contact 5 in order to form an electrical switch. The movable electrical contact 5 is connected to an upper electrical terminal 6. A pushrod 7 is provided for operating the movable electrical contact 5. The vacuum interrupter (circuit breaker unit) 2 interrupts the current flow through the fault current limiter arrangement after the fault current limiter unit 1 can have limited a current flow in fault event. For detecting a fault event—not shown—a fault current detector is provided.

The fault current limiter unit 1 further includes a movable electrical sliding contact part 8. The electrical sliding contact part 8 is electrically arranged between the upper electrical terminal 6 of the vacuum interrupter (circuit breaker unit) 2 and the movable electrical contact 5 of the vacuum interrupter (circuit breaker unit) 2. The movable electrical sliding contact part 8 is shaped as a circular disk or as a conical shaped one side or double side disc having an inner electrically sliding contact ring 9 for connecting to the outer surface of the pushrod 7 and an outer electrical sliding contact ring 10 for connecting to the inner surface of a housing sleeve 11. The housing sleeve 11 surrounds the pushrod 7 and electrically connects the upper electrical terminal 6 to the movable electrical contact 5 of the vacuum interrupter (circuit breaker unit) 2.

The movable electrical sliding contact part 8 generates a maximum electrical resistance in connection with the metallic pushrod 7 and the metallic housing sleeve 11. Therefore, the movable electrical sliding contact part 8 is movable between a short circuit position A which is located adjacent to the upper electrical terminal 6 and a remote position B which is located far from the upper electrical terminal 6 on the top of the metallic housing sleeve 11. In the remote position B the fault current limiter unit 1 provides a maximum electrical resistance for the current flow, because the current has to flow from the upper electric terminal 6 through the housing sleeve 11, the movable electrical sliding contact part 8, the pushrod 7 to the movable electrical contact 5.

In order to move the circular disk shaped sliding contact part 8 along the pushrod 7, the mechanical actuator is provided which includes a micro gas generator 12 which is arranged in the area between the housing sleeve 11 and vacuum interrupter insert 2. If compressed gas is provided from the micro gas generator 12 to load the bottom side of the disk shaped sliding contact part 8, a position is changed from the short circuit position A—as shown—to the remote position B (dotted lines). Furthermore, a contact spring unit 13 is provided for keeping the electrical contacts 3 and 5 closed. The contact spring unit 13 is arranged at the distal end of the housing sleeve 11. The contact spring unit 13 is mechanically connected to the respective end of the pushrod 7.

Figure 2:
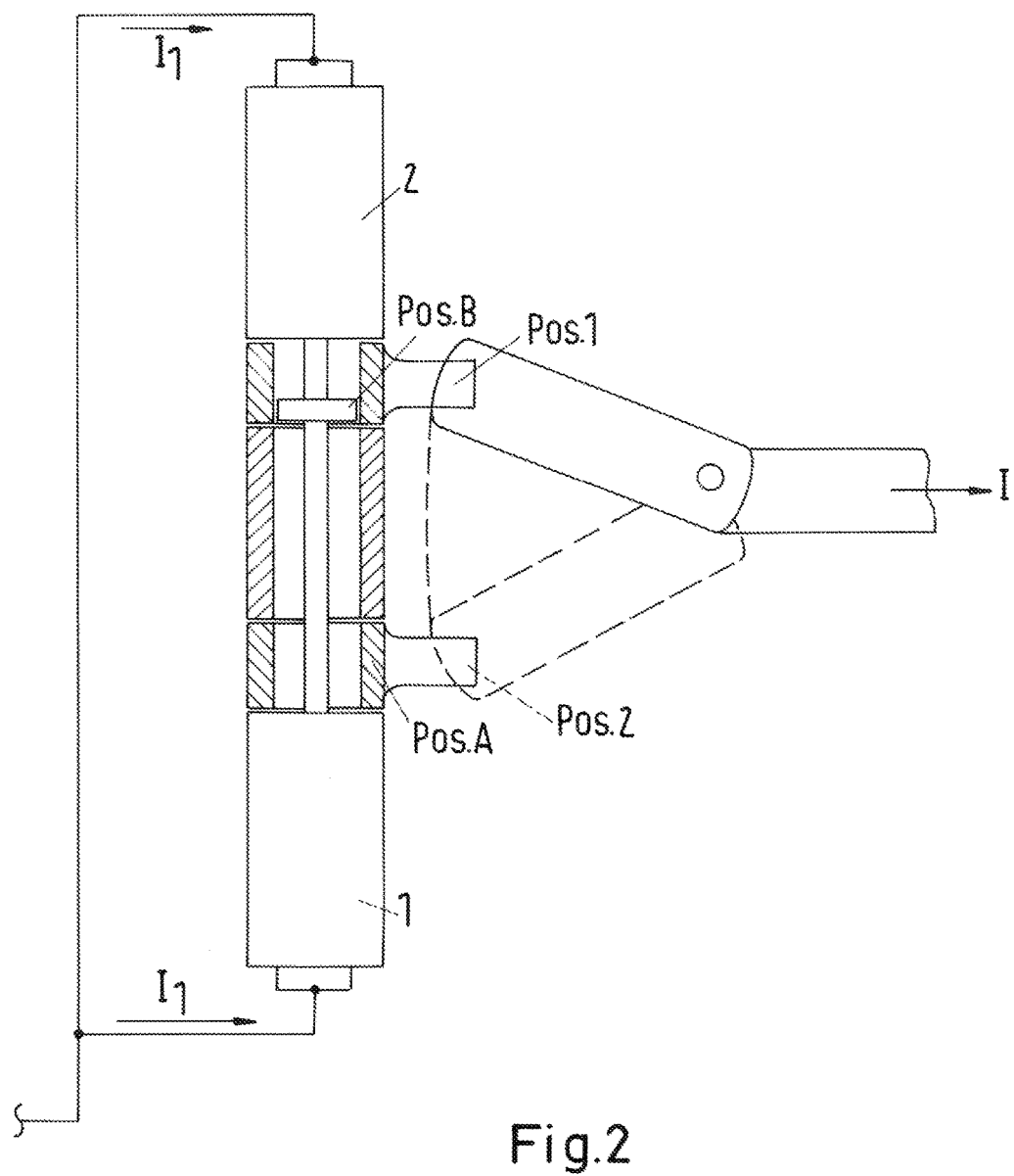
FIG. 2 shows an additional disconnection according to an exemplary embodiment of the disclosure, for resetting when vacuum interrupters are installed on both sides of the fault current limiter arrangement.

The contact spring unit 13 corresponds to a bistable mechanical mechanism unit 14 in order to keep the electrical contacts 3 and 5 in its closed position, which is actuated from a mechanical impulse provided by the disk shaped sliding contact part 8 in its remote position B in order to bring the electrical contacts 3 and 5 in its opened position. Additionally, a driver is provided for reset the sliding contact part 8 from the remote position B back the short circuit position A. FIG. 2 shows an additional disconnection according to an exemplary embodiment of the disclosure, for resetting when vacuum interrupters are installed on both sides of the fault current limiter arrangement.

In order to increase the electrical resistance of the fault current limiter unit 1 the inner surface of the metallic housing sleeve 11 is provided with longitudinal cutting slots 15.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE SIGNS 1 fault current limiter unit
2 vacuum interrupter (circuit breaker unit)
3 fixed electrical contact
4 lower electrical terminal
5 movable electrical contact
6 upper electrical terminal
7 metallic pushrod
8 movable electrical sliding contact part
9 inner electrical sliding contact ring
10 outer electrical sliding contact ring
11 housing sleeve
12 micro gas generator
13 contact spring unit
14 bistable mechanical mechanism unit
15 cutting slots
A short circuit position
B remote position

What is claimed is:

1. A fault current limiter arrangement for a low, medium and high voltage electricity grid, comprising:
    a fault current limiter unit arranged in line with a circuit breaker unit for interrupting a current flow after the fault current limiter unit has limited current flow in a detected fault event, the circuit breaker unit including a fixed electrical contact connected to a lower electrical terminal and a movable electrical contact connected to an upper electrical terminal,
    a metallic pushrod for acting on the movable electrical contact of the circuit breaker unit, and
    a metallic housing sleeve surrounding the pushrod and electrically connected to the upper electrical terminal,
    wherein the fault current limiter unit includes a movable electrical sliding contact part electrically arranged between the upper electrical terminal of the circuit breaker unit and the movable electrical contact of the circuit breaker unit, and which is movable between a short circuit position adjacent to the upper electrical terminal and a remote position from the upper electrical terminal for providing a maximum electrical resistance for the current flow, the pushrod and housing sleeve being configured to increase electrical resistance in connection with the movable electrical sliding contact part.

2. The fault current limiter arrangement according to claim 1,
    wherein the movable electrical sliding contact part is shaped as a circular or a conical disk on at least one side and has an inner electrical sliding contact ring for connecting to an outer surface of the pushrod and an outer electrical sliding contact ring for connecting to an inner surface of the housing sleeve.

3. The fault current limiter arrangement according to claim 2, comprising:
    a mechanical actuator provided for axially moving the circular or conical disk shaped sliding contact part along the pushrod for switching between the short circuit position and the remote position.

4. The fault current limiter arrangement according to claim 3,
    wherein the mechanical actuator comprises:
    a compressed gas for acting on the circular disk shaped sliding contact part like a piston, wherein the compressed gas is stored in or generated from a micro gas generator arranged in an area between the housing sleeve and a vacuum interrupter insert.

5. The fault current limiter arrangement according to claim 2, comprising:
    a contact spring unit arranged at a distal end of the housing sleeve and mechanically connected to the pushrod for generating a contact force for keeping the electrical contacts closed.

6. The fault current limiter arrangement according to claim 5,
    wherein the contact spring unit is a bistable mechanical mechanism unit for keeping the electrical contacts in a closed position, which is actuated from a mechanical impulse provided by the disk shaped sliding contact part in its remote position in order to bring the electrical contacts to an opened position.

7. The fault current limiter arrangement according to claim 1,
    wherein an inner surface of the metallic housing sleeve is provided with longitudinal or circumference cutting slots in order to increase the electrical resistance.

8. The fault current limiter arrangement according to claim 1,
wherein at least an outer surface of the metallic housing sleeve is covered with a plastic insulation material.

9. The fault current limiter arrangement according to claim 1, comprising:
an additional driver provided for resetting the sliding contact part from the remote position back to the short circuit position.

10. The fault current limiter arrangement according to claim 1, comprising:
a double vacuum interrupter and disconnector switch to form a multi-shot device with a bi-position contact after a fault current limiting operation.

11. The fault current limiter arrangement according to claim 1,
wherein the circuit breaker unit is a vacuum interrupter.

12. The fault current limiter arrangement according to claim 1,
wherein the circuit breaker unit is a simple connection terminal.

* * * * *